(12) United States Patent
Stegawski

(10) Patent No.: US 9,499,213 B2
(45) Date of Patent: Nov. 22, 2016

(54) COMPLIANT ISOLATOR

(71) Applicant: Piotr Stegawski, Kirkland, WA (US)

(72) Inventor: Piotr Stegawski, Kirkland, WA (US)

(73) Assignee: PACCAR INC, Bellevue, WA (US)

( * ) Notice: Subject to any disclaimer, the term of this patent is extended or adjusted under 35 U.S.C. 154(b) by 0 days.

(21) Appl. No.: 14/799,391

(22) Filed: Jul. 14, 2015

(65) Prior Publication Data

US 2015/0314812 A1 Nov. 5, 2015

Related U.S. Application Data

(63) Continuation-in-part of application No. 13/790,988, filed on Mar. 8, 2013, now Pat. No. 9,205,877.

(51) Int. Cl.
*B62D 27/04* (2006.01)
*F16C 11/12* (2006.01)
*B62D 33/067* (2006.01)
*B62D 27/06* (2006.01)
*B62D 33/06* (2006.01)

(52) U.S. Cl.
CPC .............. *B62D 27/04* (2013.01); *B62D 27/06* (2013.01); *B62D 33/0604* (2013.01); *B62D 33/067* (2013.01); *F16C 11/12* (2013.01); *Y10T 403/32* (2015.01); *Y10T 403/32057* (2015.01); *Y10T 403/32614* (2015.01)

(58) Field of Classification Search
CPC ........ B60R 9/06; B62D 24/04; B62D 27/04; B62D 27/06; B62D 33/0604; B62D 33/067; F16B 7/0433; F16B 7/044; F16C 11/04; F16C 11/045; F16C 11/12
USPC ........ 403/52, 59, 71, 73, 111, 113, 119–121, 403/220, 229, 291; 296/190.05, 190.07; 267/157; 224/319; 180/89.13, 89.14
See application file for complete search history.

(56) References Cited

U.S. PATENT DOCUMENTS

| | | | |
|---|---|---|---|
| 3,488,098 A | | 1/1970 | Sobczak |
| 3,932,045 A | * | 1/1976 | Hillberry .............. F16C 11/12 403/121 |
| 3,945,053 A | | 3/1976 | Hillberry |
| 5,599,268 A | | 2/1997 | Andersson |
| 7,159,614 B2 | | 1/2007 | Tiziani |
| 8,881,520 B2 | | 11/2014 | Emigh |

* cited by examiner

*Primary Examiner* — Josh Skroupa
(74) *Attorney, Agent, or Firm* — Christensen O'Connor Johnson Kindness PLLC

(57) ABSTRACT

A mounting assembly that includes a strap adjustment assembly having a curved cylindrical portion, a strap end mounting assembly, and a strap assembly. The strap assembly includes first and second straps, each of the first and second straps having first and second ends, wherein the first ends of the first and second straps are secured to the strap adjustment assembly and wherein the second ends of the first and second straps are secured to the strap end mounting assembly, and wherein each of the first and second straps extends at least partially along the curved cylindrical portion.

20 Claims, 8 Drawing Sheets

COMPLIANT ISOLATOR

CROSS-REFERENCE TO RELATED APPLICATION

This application is a continuation-in-part of U.S. application Ser. No. 13/790,988, filed Mar. 8, 2013, the disclosure of which is hereby expressly incorporated by reference herein in its entirety.

BACKGROUND

It is common for vehicles to include components or parts that are secured to one another while being moveable relative to one another. For instance, in Class 8 heavy duty vehicles, the cab is typically moveably mounted to the chassis to accommodate and isolate vibrations, rocking, tilt, etc., therebetween. Furthermore, the chassis or frame may also include components that are movably secured to one another to accommodate movements in the frame over various road conditions.

Movable components of a vehicle are generally secured to one another in one of a variety of ways. For instance, the components may be secured to one another through a linear bearing or bushing mounting assembly that enables movement in a travel direction with low resistance, but substantially prevents any movement in a perpendicular cross-travel direction.

The use of linear bearings and/or bushings has significant drawbacks, especially when used on the exterior of a vehicle. For instance, linear bearings and bushings have the propensity to bind or wear out in the presence of environmental contamination, such as debris, water, ice, etc. The possibility of contamination usually necessitates some method of sealing the linear bushing or bearing to limit exposure to the environmental contaminants, which drives up the cost of the linear bearing or bushing mounting assembly. The seals also tend to degrade over time, requiring replacement of the seals and/or exposing the linear bearing or bushing assembly to environmental contaminants. Linear bearings also tend to be inherently expensive due to a large number of precision parts. Bushings are a less expensive option; however, bushings are a lower performance, less durable solution to linear bearings. More particularly, the durability of the bushing generally decreases as the parts continue to slide and wear on one another. The performance is even further compromised by environmental contaminants.

Another common solution that is not similarly affected by environmental conditions is the utilization of a soft, elastic material such as natural rubber to mount the vehicle components together. Because the elastic material is soft, it allows some movement between the parts. Moreover, the dimensions of the elastic material can be configured to make the elastic material stiffer in a first direction, while allowing movement in, for instance, a second, perpendicular direction. More specifically, a rubber block that is essentially rectangular is longer in one direction; and therefore, it is more difficult to move the components along the length of the block versus the thinner, perpendicular direction. However, movement in the perpendicular direction (across the thinner portion of the rubber block) typically requires large strains in the rubber with only limited displacement capability.

Thus, it can be appreciated that an improved mounting assembly for movably mounting components to one another, without being susceptible to environmental contamination and without requiring large strains in the material, is desired.

SUMMARY

A first embodiment of a mounting assembly includes an attachment assembly and a strap attachment assembly having a cylinder moveable relative to the attachment assembly along a first axis. The mounting assembly further includes a strap at least partially encircling the cylinder, wherein the strap has first and second strap ends with at least one of the first and second strap ends secured to the attachment assembly such that the strap allows movement of the cylinder substantially along the first axis, and such that the strap substantially prevents movement of the cylinder along a second axis substantially transverse to the first axis.

A second embodiment of a mounting assembly includes a strap adjustment assembly having a curved cylindrical portion, a strap end mounting assembly, and a strap assembly. The strap assembly includes first and second straps, each of the first and second straps having first and second ends, wherein the first ends of the first and second straps are secured to the strap adjustment assembly and wherein the second ends of the first and second straps are secured to the strap end mounting assembly, and wherein each of the first and second straps extends at least partially along the curved cylindrical portion.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

Figure 1:
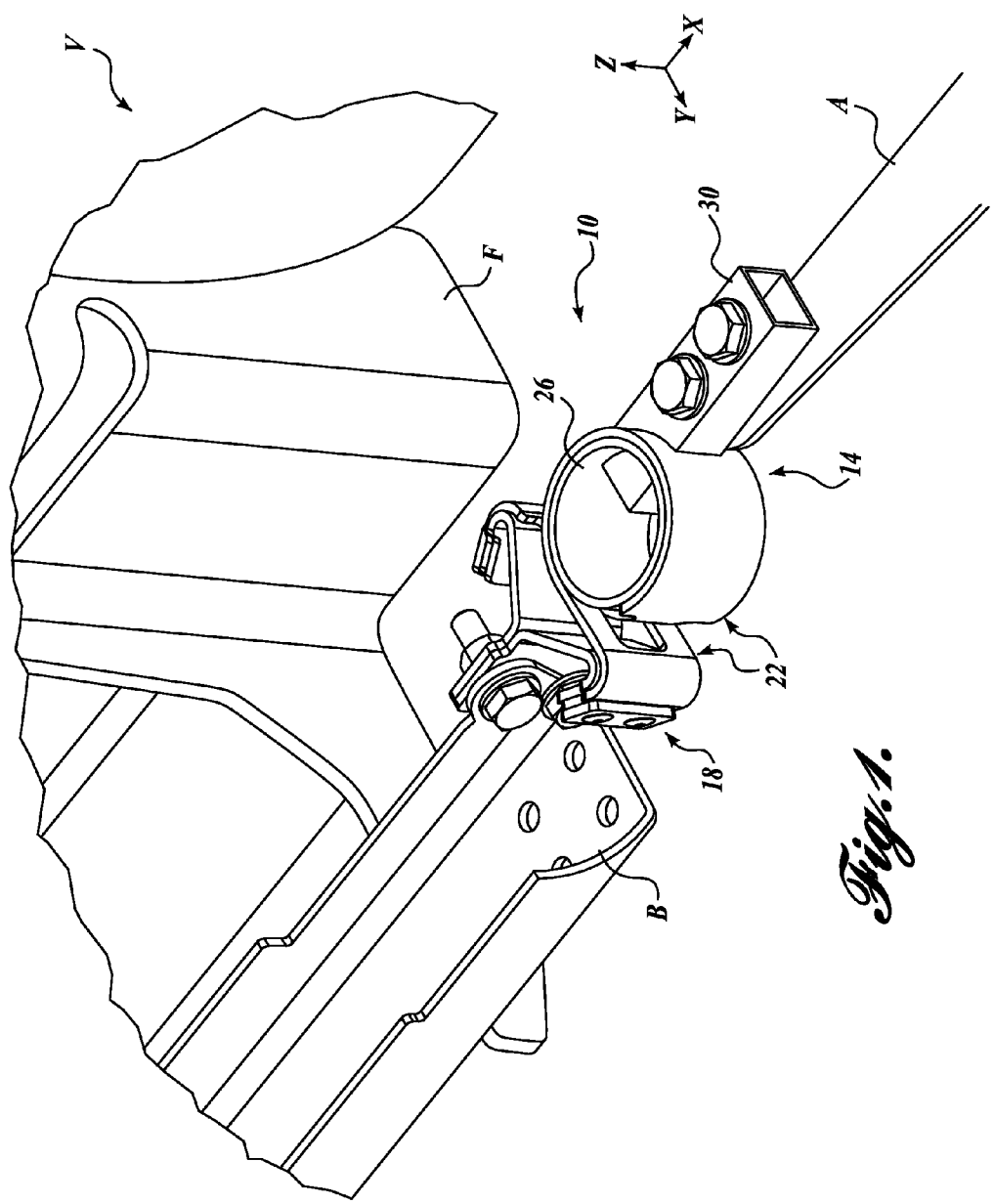
FIG. 1 is an environmental isometric view of a compliant isolator formed in accordance with an exemplary embodiment of the present disclosure, wherein the compliant isolator is shown in use with a vehicle.

Referring to FIG. 1, a mounting assembly, or a compliant isolator 10 formed in accordance with an exemplary embodiment of the present disclosure is depicted. The compliant isolator 10 is configured to secure first and second components together such that at least one of the components may move along a first axis X (for instance, in a fore/aft direction), and such that both components are substantially prevented from moving along a substantially perpendicular Y axis (for instance, in a cross-car direction).

In general, the compliant isolator 10 includes a strap adjustment assembly 14 movably secured to a strap mounting assembly 18 through a strap 22. In the depicted embodiment, the strap adjustment assembly 14 is movably connected to a first component A of a vehicle V, and the strap end mounting assembly 18 is connected to a second component B of the vehicle V. Although the compliant isolator 10 may be used to connect any suitable components of the vehicle V, the isolator 10 is shown connecting components A and B of the vehicle frame F. Moreover, the isolator is shown having the first component A, movable relative to the second component B, which is fixed to the frame F. However, it should be appreciated that the first component A may instead be fixed, with the second component B being movable relative thereto. As yet another alternative, both first and second components A and B may be moveable relative to each other.

Moreover, it should be appreciated that although the compliant isolator 10 is shown in use with components of a vehicle V, the compliant isolator 10 may instead be used to connect any suitable components of an assembly. Thus, the disclosure and illustrations provided herein should not be seen as limiting the scope of the claimed subject matter. In addition, various directional terms, such as fore/aft, cross-car, etc., may be used in describing aspects of the compliant isolator 10. Such terms are for ease of description only, and also should not be seen as limiting the scope of the claimed subject matter.

Figure 2A:
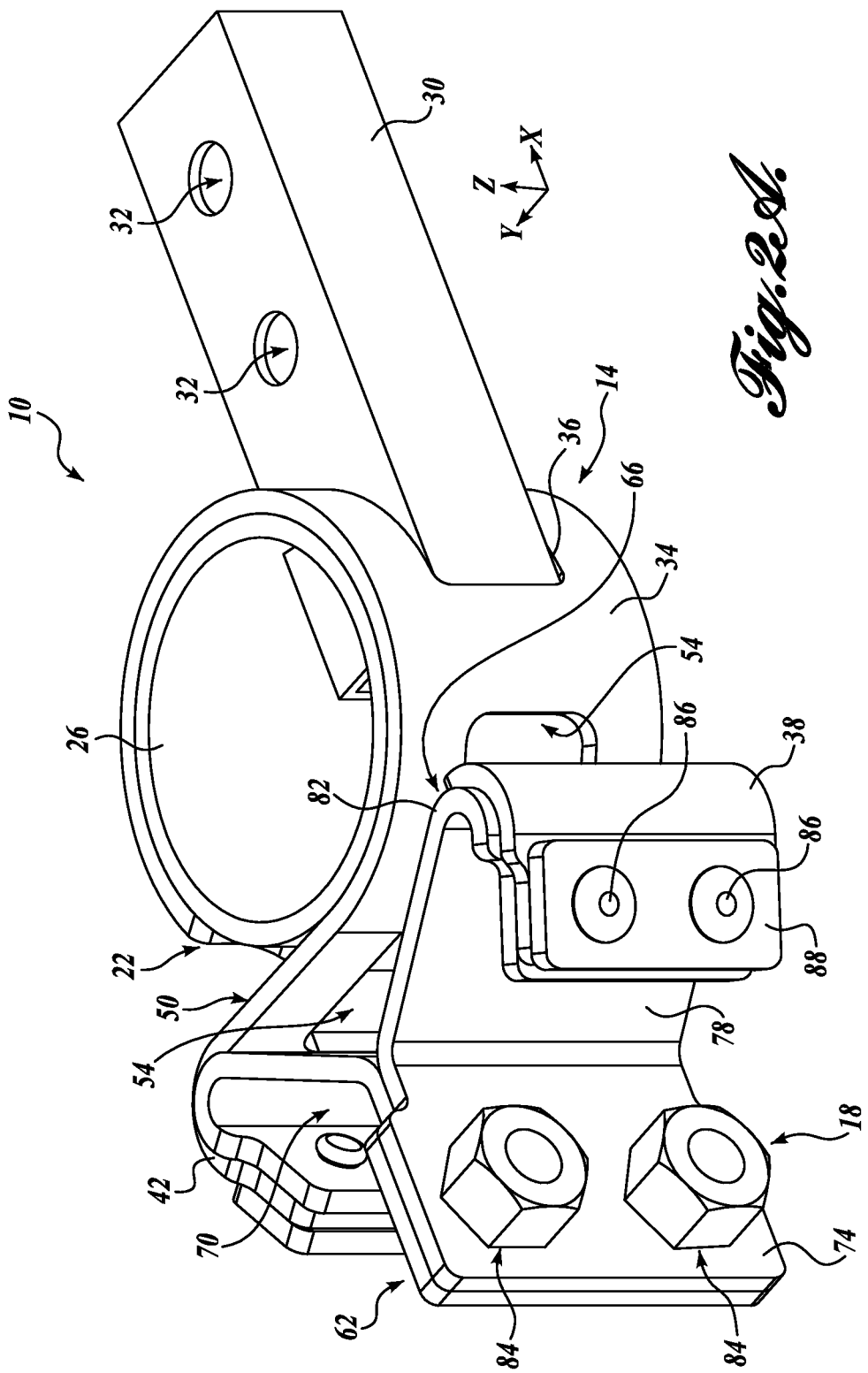
FIG. 2A is a first side isometric view of the compliant isolator of FIG. 1.
Figure 2B:
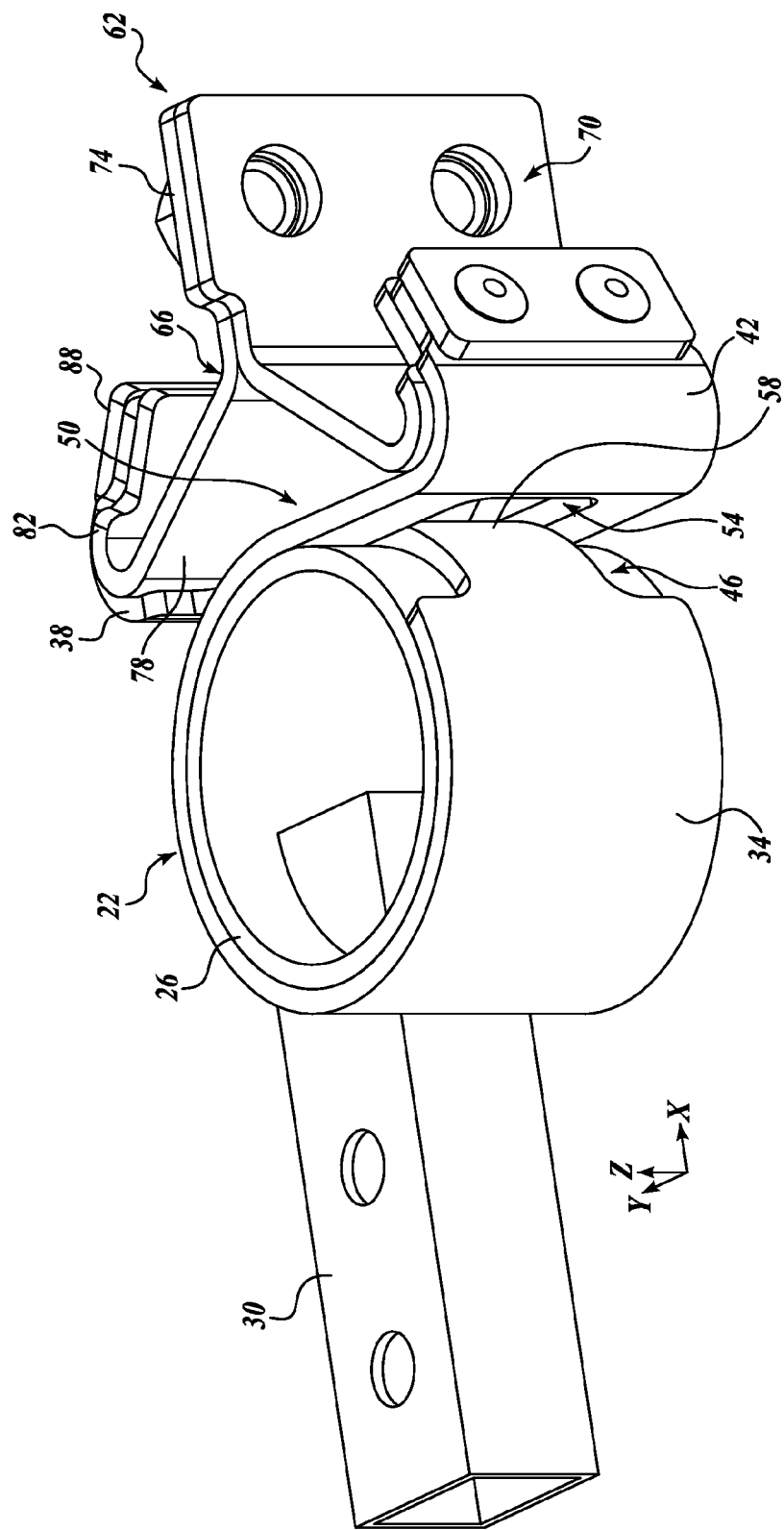
FIG. 2B is a second side isometric view of the compliant isolator of FIG. 1.

Referring to FIGS. 2A and 2B, the compliant isolator 10 will now be described in detail. As noted above, the compliant isolator 10 includes a strap adjustment assembly 14 movably secured to a strap end mounting assembly 18 through a strap 22. The strap adjustment assembly 14 includes a cylinder 26 having a length. The length of the cylinder 26 defines a central longitudinal axis, which extends substantially along a Z axis that is perpendicular to both the X axis and the Y axis.

The cylinder 26 is fixedly secured to a vehicle mounting member 30. Mounting member 30 may be any suitable bracket or other device that is secured to a portion of the cylinder 26 and that is suitable for being secured to the first vehicle component A. In that regard, the mounting member 30 may include one or more openings 32 for receiving fasteners to be secured to the first vehicle component A.

The mounting member 30 may be secured to the cylinder 26 in any suitable manner, such as by welding, with fasteners, etc. In that regard, the mounting member 30 may pass through a mounting member opening 36 in the strap 22 and cylinder 26 for securing the mounting member 30 to the cylinder 26. However, it should be appreciated that the mounting member 30 may instead extend from the exterior surface of the cylinder 26 while passing through an opening in the strap 22. Moreover, the mounting member 30 may be secured to the cylinder 26 in any other suitable manner.

As noted above, the strap 22 extends between the cylinder 26 and the strap end mounting assembly 18 for movably securing the strap adjustment assembly 14 to the strap end mounting assembly 18. In that regard, the strap 22 includes a strap body 34 extending substantially around the entire circumference of the cylinder 26. However, the strap body 34 is not secured to the outer surface of the cylinder 26; and therefore, the strap body 34 may wind and unwind around the cylinder 26.

The strap body 34 may have a thickness and width that is substantially uniform along its length, wherein the width of the strap body 34 may be substantially equal to the length of the cylinder 26. However, the length of the cylinder 26 may be greater than the width of the strap body 34 without departing from the scope of the present disclosure. As the thickness, and width of the strap body 34 increases, the durability of the compliant isolator 10 increases. Moreover, as will become appreciated from the below, an increased strap thickness and width helps increase the resistance of the compliant isolator 10 along the Y axis. It should be appreciated that the thickness and width of the strap body 34 may be increased or decreased to adjust the resistance of the strap along the Y axis.

The strap further includes first and second strap ends 38 and 42 defined at the ends of the strap 22, which are connected to a Y-shaped bracket assembly 62 of the strap end mounting assembly 18. However, the first and second strap ends 38 and 42 overlap or crisscross over one another before being secured to portions of the Y-shaped bracket assembly 62. In that regard, strap 22 includes a first tangent portion 46 extending from the cylinder 26 (see FIG. 2B) toward the first strap end 38, and a second tangent portion 50 extending from the cylinder 26 toward the second strap end 42.

The first and second strap ends 38 and 42 and first and second tangent portions 46 and 50 are substantially the same thickness and width as the strap body 34. However, in order to allow the overlapping or crisscrossing of the first and second strap ends 38 and 42, the first tangent portion 46 includes a reduced width portion 58 that is sized to pass through a first tangent portion elongated opening 54 defined along a portion of the second tangent portion 50. In this manner, the first and second tangent portions 46 and 50 may crisscross over one another and be secured to the Y-shaped bracket assembly 62 without twisting or stretching the strap 22. In effect, the width of the first and second tangent portions 46 and 50 extend substantially along the Z axis.

The first and second strap ends 38 and 42, after crisscrossing over one another, are secured to first and second brackets 66 and 70 of the Y-shaped bracket assembly 62. The first and second brackets 66 and 70 are substantially identical, with the second bracket 70 mirroring the first bracket 66. Therefore, only the first bracket 66 will be described in detail. Moreover, it should be appreciated that only one of the first and second strap ends 38 and 42 may be secured to the Y-shaped bracket assembly 62, with the other of the first or second ends 38 and 42 secured to the cylinder 26. In such an embodiment, the first or second bracket 66 or 70 may be eliminated.

The first bracket 66 defines half of the Y-shaped bracket assembly 62. In that regard, the first bracket 66 includes a stem portion 74 and a branch portion 78 extending outwardly at an angle from an edge of the stem portion 74. A curved end portion 82 is defined at the distal end of the branch portion 78. The curved end portion 82 extends in substantially the opposite direction of the branch portion 78 toward the stem portion 74.

The stem portion 74 of each of the first and second brackets 66 and 70 are secured together back to back with any suitable fasteners 84, such as a nut and bolt assembly. The first and second brackets 66 and 70 are secured together at their stem portion 74 such that the branch portion 78 of the first bracket 66 extends away from the branch portion 78 of the second bracket 70. In this manner, the first and second brackets 66 and 70, when assembled, define a substantially symmetrical Y-shaped bracket assembly 62.

The Y-shaped bracket assembly 62 is positioned such that the stem portion 74 extends away from the strap adjustment assembly 14, and the stem portion 74 is secured to the second component B. The first and second strap ends 38 and 42 are secured to the curved end portions 82 of the first and second brackets 66 and 70, respectively. When connected to the first and second brackets 66 and 70, the length of each of the first and second tangent portions 46 and 50 is substantially perpendicular to the X axis when the compliant isolator is in a first, non-displaced position, as shown in FIGS. 2A, 2B, and 4A. Stated another way, in the first, non-displaced position, the length of each of the first and second tangent portions 46 and 50 extends substantially along the Y axis.

The first and second strap ends 38 and 42 may be secured to the curved end portions 82 of the first and second brackets 66 and 70 in any suitable manner. For instance, as shown in the depicted embodiment, the first and second strap ends 38 and 42 are secured to the curved end portions 82 through fasteners 86, with a washer or plate 88 being disposed between the fasteners 86 and the curved end 82 of the first or second bracket 66 or 70.

It should be appreciated that the strap end mounting assembly 18 may instead include any other bracket assembly configuration suitable for positioning the first and second tangent portions 46 and 50 such that the width of the first and second tangent portions 46 and 50 extends substantially along the Z axis.

With the stem portion 74 secured to the second vehicle component B, as noted above, the first and second strap ends 38 and 42 are fixably secured to the strap end mounting assembly 18. As such, the strap adjustment assembly 14 may move along the X axis while remaining secured to the strap end mounting assembly 18. Moreover, movement of the strap adjustment assembly 14 along the Y axis (along the length of the first and second tangent portions 46 and 50) is substantially prevented.

Figure 3A:
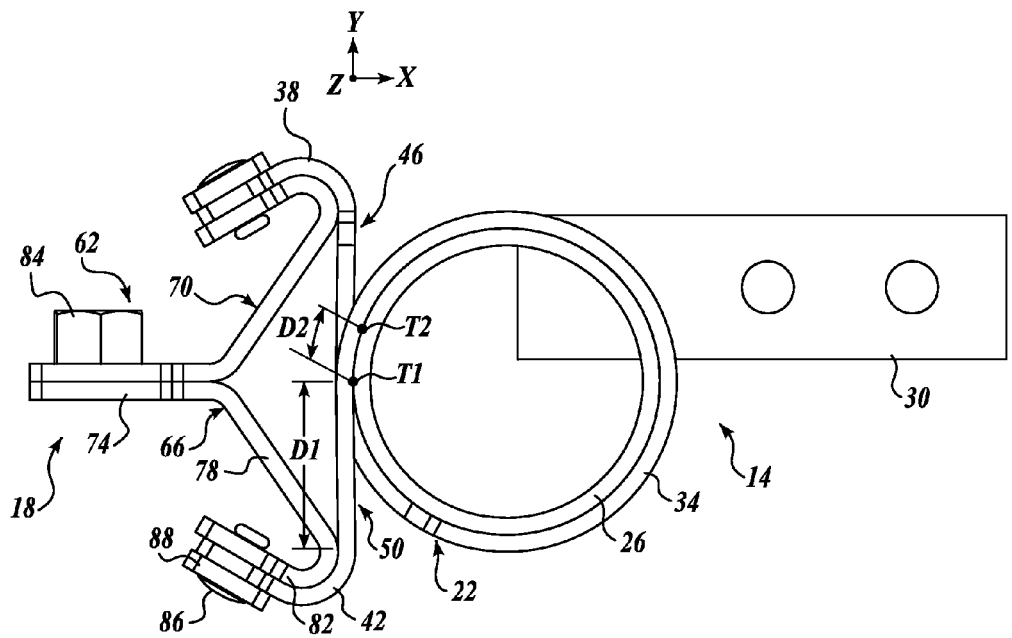
FIG. 3A is a top plan view of the compliant isolator of FIG. 1, wherein the compliant isolator is shown in a first position.
Figure 3B:
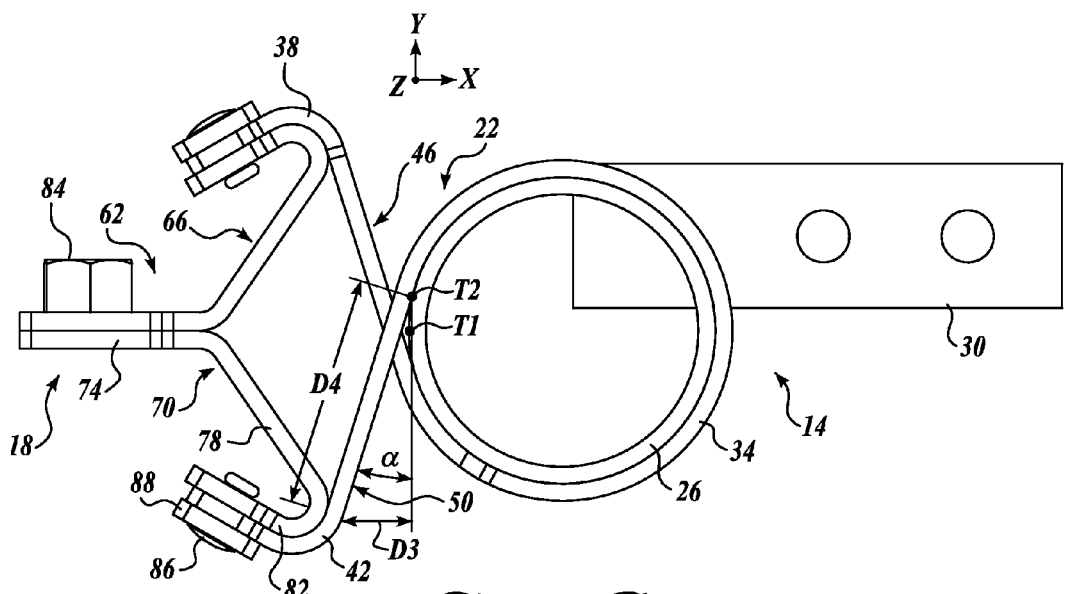
FIG. 3B is a top plan view of the compliant isolator of FIG. 1, wherein the compliant isolator is shown in a second position.

Referring to FIGS. 3A and 3B, aspects of the compliant isolator 10, for allowing the strap adjustment assembly 14 to move along the X axis while substantially preventing movement along the Y axis, will now be described in detail. The strap adjustment assembly 14 is movable along the X axis between a first non-displaced position, as shown in FIG. 3A, and a second displaced position, as shown in FIG. 3B.

Referring specifically to FIG. 3A, in the first non-displaced position, the lengths of the first and second tangent portions 46 and 50 extend substantially along the Y axis and are substantially transverse to the X axis. As such, the first angle defined between either the first or second tangent portion 46 or 50 and the Y axis is substantially equal to zero. With the first and second tangent portions 46 and 50 positioned substantially transverse to the X axis, the first and second tangent portions 46 and 50 must stretch along their length to allow the cylinder 26 to move along the Y axis. If the strap 22 is made from a suitably durable material, such as rubber, and the strap 22 has a sufficient thickness and width, the strap 22 substantially prevents any movement along the Y axis. It should be appreciated that if only one strap end 46 or 50 is secured to the Y-shaped bracket assembly 62 (with the other strap end secured to the cylinder 26), the strap 22 would substantially prevent movement along the Y axis in only one direction.

However, the strap 22 is configured to allow movement along the X axis. In the first non-displaced position, the first and second tangent portions 46 and 50 each have a predetermined initial length. For instance, as shown in FIG. 3A, the initial actual length of the second tangent portion 50 is D1, which is the distance from a first tangency point T1 to the curved end 82 of the first bracket 66. The second tangent portion 50 also includes an unwindable length D2 defined along an arced portion of the cylinder 26. In other words, D2 is the distance the strap 22 may unwind from the cylinder 26 to allow the cylinder 26 to move along the X axis.

Referring to FIG. 3B, the strap adjustment assembly 14 is moved into a second displaced position by moving the cylinder 26 along the X axis away from strap end mounting assembly 18 a predetermined distance D3. To facilitate the cylinder movement without substantially increasing the strain in the strap 22, the strap 22 partially unwinds from the cylinder 26 as the cylinder 26 is moved along the X axis to increase the length of the second tangent portion 50.

The strap 22 partially unwinds from the cylinder 26 the predetermined amount D2 as the cylinder 26 is moved along the X axis. Referring to FIG. 3B, when the second tangent portion 50 unwinds from the cylinder 26 the predetermined amount D2, the tangency point moves from T1 to T2. As a result, the second tangent portion 50 now has a longer length D4 defined between the second tangency point T2 to the curved end 82 of the first bracket 66. Thus, the length of the second tangent portion 50 increases to accommodate the cylinder movement without substantially increasing the strain therein (wherein the same is true for the first tangent portion 46).

The second length D4 of the second tangent portion 50 is equal to at least the sum of the first length D1 plus the unwound length D2. In prior art rubber isolators, the length of the rubber must stretch to increase in length and accommodate movement. Thus, the strain in strap 22 of the compliant isolator 10 is significantly less than the strain in a prior art rubber isolator.

When strap 22 unwinds from the cylinder 26 to lengthen the second tangent portion 50, the second tangent portion 50 also defines a second angle between the second tangent portion 50 and the Y axis (wherein that same is true for the first tangent portion 46). As shown in FIG. 3B, the second tangent portion 50 defines an angle α between the second tangent portion 50 and the Y axis, wherein angle α is greater than zero.

As can be appreciated from the foregoing, the compliant isolator 10 allows for movement of the cylinder 26 along the X axis without requiring a significant strain in the strap 22. More specifically, rather than requiring the strap 22 to significantly stretch in order to accommodate movement of the cylinder 26 along the X axis, the tangent portions 46 and 50 of the strap 22 unwind from the cylinder 26 to increase in length. With the strap 22 being wound around the cylinder 26, the cylinder 26 converts the arced body portion D2 of the strap 22 into a straight line by repositioning the tangency point from T1 to T2. The change in tangency point effectively gives the first and second tangent portions 46 and 50 extra length, thereby reducing the strain in the strap 22. Thus, displacement of the cylinder 26 along the X axis requires a very small amount of strain relative to the displaced distance D3. The reduction in strain results in decreased resistance to motion of the cylinder 26 along the X axis.

The movement capability and restriction of the compliant isolator is similar to a linear bearing or bushing that allows a component to move along a first axis, but substantially prevents movement along the second perpendicular axis. However, the compliant isolator 10 is not susceptible to wear like linear bearings and bushings because it does not include any sliding, hinging, or rolling parts. Moreover, the compliant isolator is more economical to produce as precision parts are not needed. Furthermore, environmental contamination, such as debris, water, and ice, does not substantially affect the function of the compliant isolator 10 as it would with a linear bearing or bushing.

The compliant isolator 10 also provides advantages over a prior art compliant isolator in that a very small amount of strain in the strap 22 is necessary to move the component along a desired axis. This distinction will be further illustrated by the example below.

EXAMPLE

Referring still to FIGS. 3A and 3B, an exemplary calculation of the strain in the lengthened second tangent portion 50 of the strap 22 in comparison to a prior art design will be hereinafter provided to illustrate aspects of the compliant isolator 10. First, using mathematical methods known to those of ordinary skill in the art, the exemplary strain in the second tangent portion 50 when the cylinder 26 is moved into the displaced position will be calculated.

For the purposes of strain calculation, the following dimensions are used:

D1=30 mm
D2=13.9 mm
D3=20 mm
D4=49.73 mm

It should be appreciated that the above dimensions may by derived either mathematically (with certain variables known) or by measurement.

Referring specifically to FIG. 3A, the second tangent portion 50 includes an original length D1, which is the distance between the first tangent point T1 and the second strap end 42. The unwindable length D2 (the distance between the first tangent point T1 and the final tangent point T2) is added to D1 to give the second tangent portion 50 a total effective length, before displacement, of D1 plus D2.

Referring to FIG. 3B, the cylinder 26 is displaced 20 mm (D3) along the X axis, and the final length of the strap D4 may be calculated or measured to be 49.73 mm. Strain in the second tangent portion 50 may then be calculated as the difference between the original effective strap length and the final strap length divided by the original effective strap length. Thus, the strain is calculated as follows, with M representing strain.

$$\epsilon = (D4-(D1+D2))/(D1+D2)$$

Plugging the known dimensions into the above equation, the strain in the strap is about 13.3% when the cylinder is displaced by D3, or 20 mm.

Figure 4:
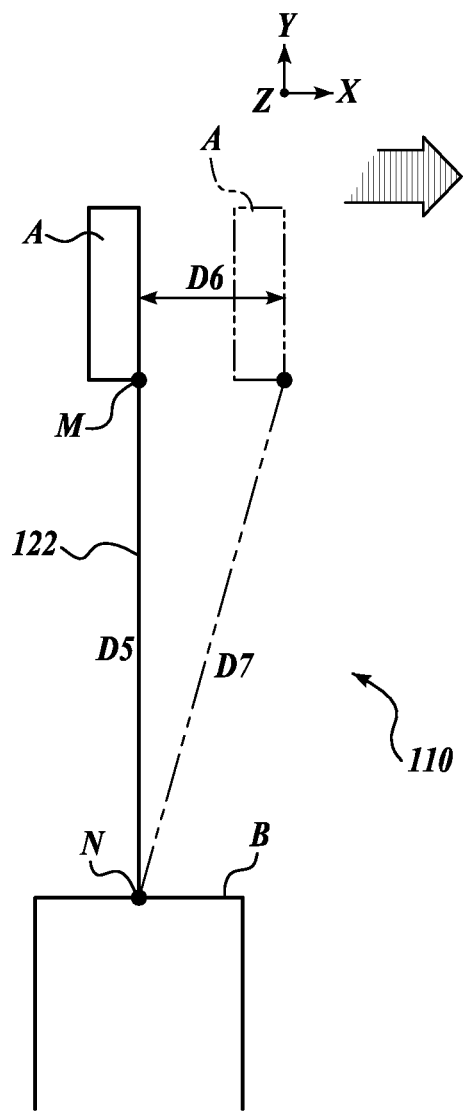
FIG. 4 is a prior art design of a compliant connection assembly shown moving between first and second positions.

Referring to FIG. 4, a calculation of the strain in a prior art compliant isolator 110 will now be provided for comparison. In the exemplary prior art compliant isolator 110, a strap 122 having an initial length D5 extends between a first component, or cylinder A, and a second component B. The strap 122 is fixed at both its ends at points M and N. When the cylinder A is displaced along the X axis a predetermined distance D6, such as 20 mm, the strap 122 must effectively stretch to lengthen and accommodate the displacement D6.

In this example, the original length of the strap D5 is equal to 30 mm, similar to the strap 22 in the compliant isolator 10. When the cylinder A is displaced 20 mm along the X axis, the final length of the strap D5 is measured or calculated to be 36.05 mm. Thus, the strain in the strap 122 of the prior art compliant isolator 110 is 20.2% (calculated using the same equation set forth above). Thus, the 20.2% strain in the strap 122 of the prior art compliant isolator 110 is significantly greater than the 13.3% strain in the strap 22 of the compliant isolator 10. Accordingly, it can be appreciated that the compliant isolator 10 provides advantages over a prior art compliant isolator in that a very small amount of strain in the strap is necessary to move the component along a desired axis.

Referring now to FIGS. 5A, 5B, 6A, and 6B, a compliant isolator 210 formed in accordance with a first alternative exemplary embodiment of the present disclosure is depicted. The compliant isolator 210 is similar to the compliant isolator 10 described above in that it is configured to secure first and second components together such that at least one of the components may move along a first axis X (for instance, in a fore/aft direction), and such that both components are substantially prevented from moving along a substantially perpendicular Y axis (for instance, in a cross-car direction).

Figure 5A:
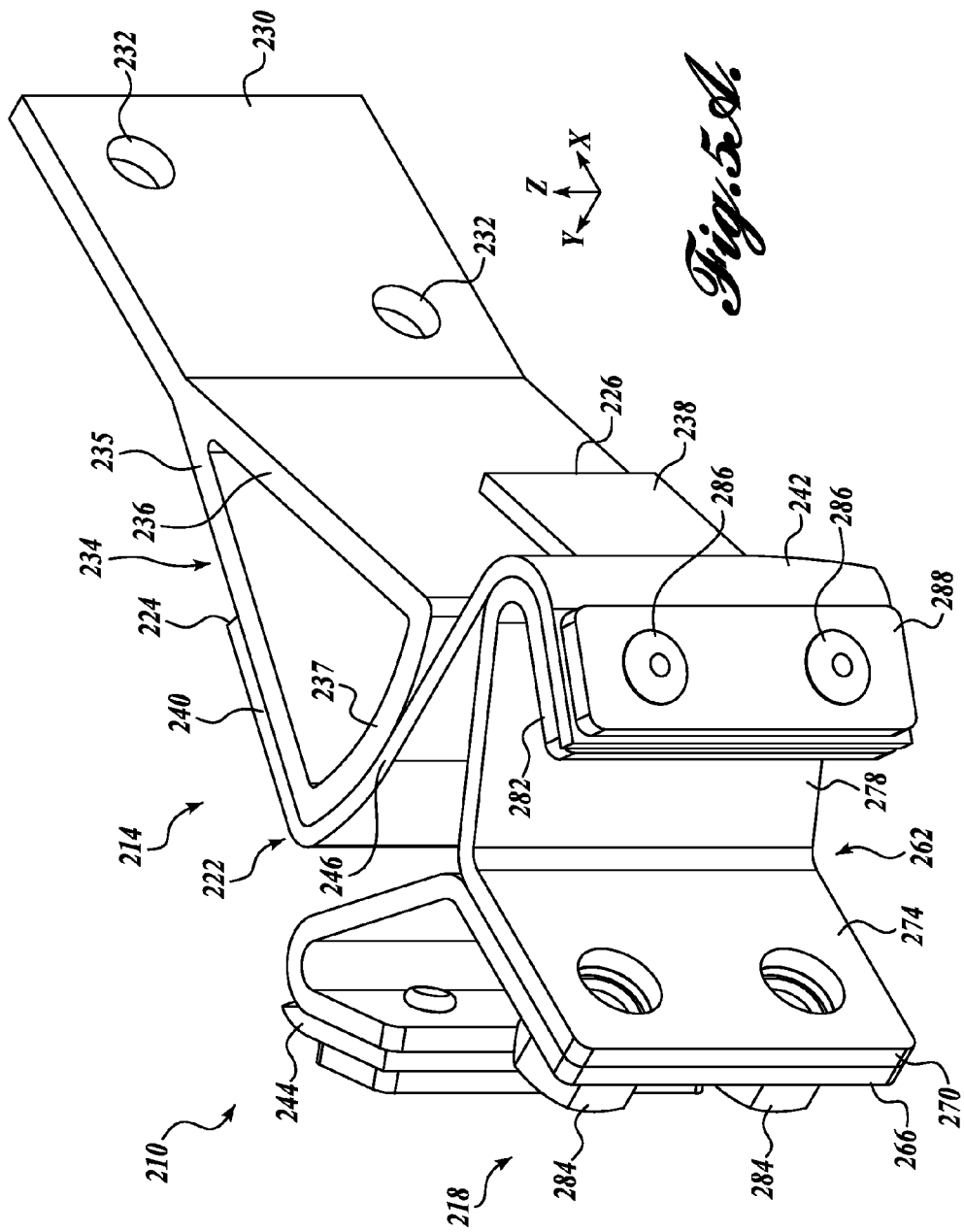
FIG. 5A is a first side isometric view of a compliant isolator formed in accordance with a first alternative exemplary embodiment of the present disclosure.
Figure 5B:
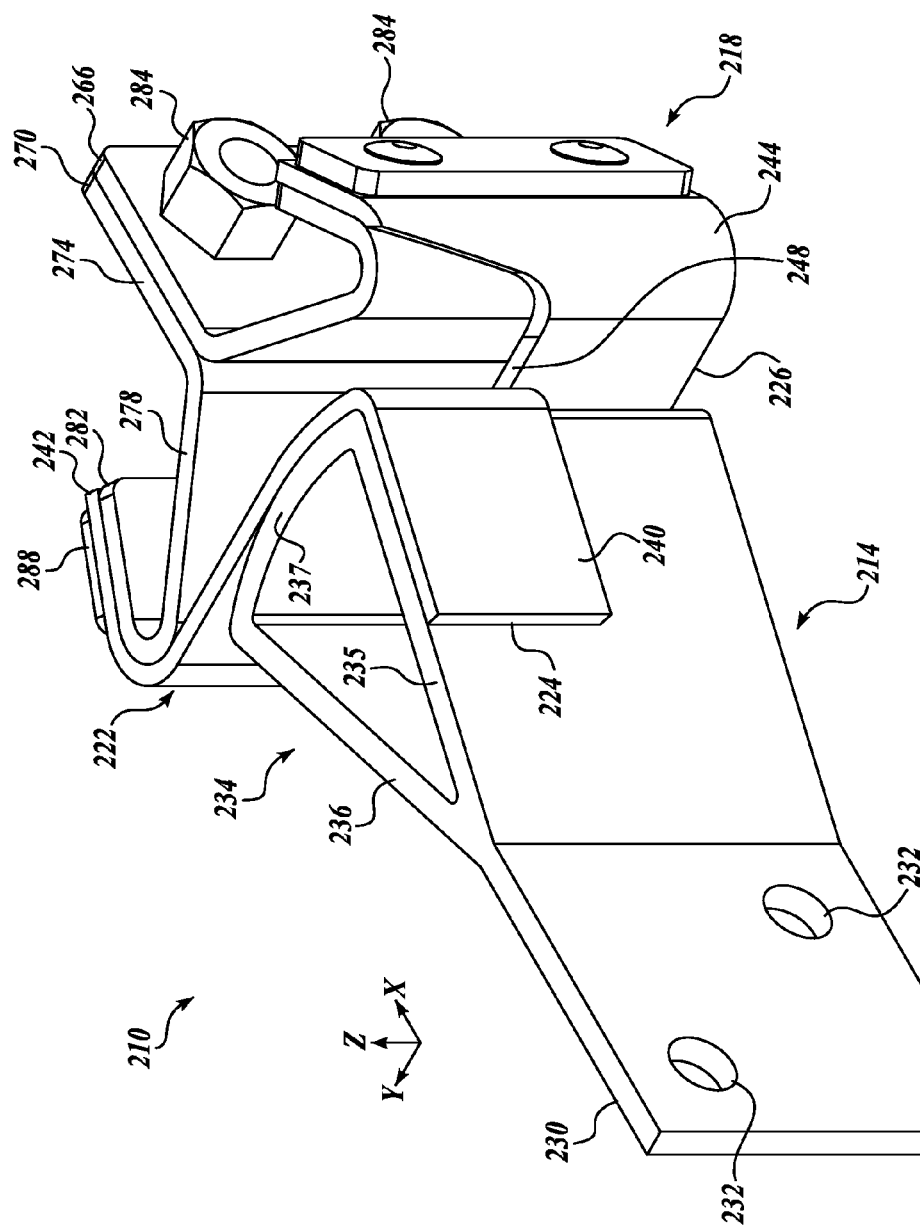
FIG. 5B is a second side isometric view of the compliant isolator of FIG. 5A.

Referring to FIGS. 5A and 5B, the compliant isolator 210 will now be described in detail. The compliant isolator 210 includes a strap adjustment assembly 214 moveably secured to a strap mounting assembly 218 through a strap assembly 222. In the depicted embodiment, the strap adjustment assembly 214 is configured to be connected to a first component of a vehicle (not shown), and the strap end mounting assembly 218 is configured to be connected to a second component of a vehicle (not shown). Through the connection of the compliant isolator 210, either one or both of the first and second components may be moveable relative to the other component along the first axis X.

The strap adjustment assembly 214 includes a vehicle mounting member 230 defined at a first end that is configured to be secured to a first component of a vehicle. The vehicle mounting member 230 may be any suitable configuration, such as a bracket. The vehicle mounting member 230 may be secured to the first vehicle component in any suitable manner, such as by passing fasteners through one or more openings 232.

The strap adjustment assembly 214 further includes a strap mounting assembly 234 defined at a second end of the strap adjustment assembly 214 opposite the vehicle mounting member 230. The strap mounting member 234 is shaped and configured to suitably secure the strap assembly 222 to the strap adjustment assembly 214. More specifically, the strap mounting member 234 is shaped to allow at least a portion of the strap assembly 222 to wind and unwind from the strap mounting member 234 to enable movement of the first and second components along the first axis X.

In the depicted embodiment, the strap mounting member 234 includes first and second branch portions 235 and 236 extending outwardly at an angle from the vehicle mounting member 230 in a substantially Y-shaped configuration. A curved cylindrical portion 237 extends between the distal ends of the first and second branch portions 235 and 236. The strap assembly 222 is secured to the strap mounting member 234 such that at least a portion of the strap assembly 222 may wind and unwind from the cylindrical portion 237.

In that regard, it should be appreciated that the strap mounting member 234 may instead be any suitable configuration that includes a curved cylindrical portion.

The strap assembly 222 includes first and second straps 224 and 226 extending between the strap mounting member 234 and the strap end mounting assembly 218. A first end 240 of the first strap 224 is secured to the first branch portion 235, and a second end 242 of the first strap 224 is secured to a Y-shaped bracket assembly 262 of the strap end mounting assembly 218. Likewise, a first end 238 of the second strap 226 is secured to the second branch portion 236, and a second end 244 of the second strap 226 is secured to the Y-shaped bracket assembly 262.

Similar to the compliant isolator 10 described above, the first and second straps 224 and 226 overlap or crisscross over one another before being secured to portions of the Y-shaped bracket assembly 262. In that regard, the first end 240 of the second strap 226 is secured to an upper portion of the first branch portion 235 (with the height of the first branch portion 235 defined along the Z axis), and the first end 238 of the second strap 226 is secured to a lower portion of the second branch portion 236 (with the height of the second branch portion 236 defined along the Z axis). In this manner, the second strap 226 may pass beneath the first strap 224 before being connected to the Y-shaped bracket assembly 262.

The first strap 224 extends from the first branch portion 235 and wraps partially around the cylindrical portion 237 of the strap mounting member 234. When extending from the cylindrical portion 237 to the Y-shaped bracket assembly 262, the first strap 224 defines a first tangent portion 246. Similarly, the second strap 226 extends from the second branch portion 236 and wraps partially around the cylindrical portion 237 of the strap mounting member 234. When extending from the cylindrical portion 237 to the Y-shaped bracket assembly 262, the second strap 226 defines a second tangent portion 248.

The second ends 242 and 244 of the first and second straps 224 and 226, after crisscrossing over one another, are secured to first and second brackets 266 and 270 of the Y-shaped bracket assembly 262. The first and second brackets 266 and 270 are substantially identical, with the first bracket 266 mirroring the second bracket 270. Therefore, only the second bracket 270 will be described in detail. Moreover, it should be appreciated that the strap assembly 22 may instead include only one of the first and second straps 224 or 226. In such an embodiment, the first or second bracket 266 or 270 may be also eliminated.

The second bracket 270 defines half of the Y-shaped bracket assembly 262. In that regard, the second bracket 270 includes a stem portion 274 and a branch portion 278 extending outwardly at an angle from an edge of the stem portion 274. A curved end portion 282 is defined at the distal end of the branch portion 278. The curved end portion 282 extends in substantially the opposite direction of the branch portion 278 toward the stem portion 274.

The stem portion 274 of each of the first and second brackets 266 and 270 are secured together back to back with any suitable fasteners 284, such as a nut and bolt assembly. The first and second brackets 266 and 270 are secured together at their stem portion 274 such that the branch portion 278 of the first bracket 266 extends away from the branch portion 278 of the second bracket 270. In this manner, the first and second brackets 266 and 270, when assembled, define a substantially symmetrical Y-shaped bracket assembly 262. The stem portions 274 of the first and second brackets 266 and 270 extend in a direction substantially opposite the vehicle mounting member 230 when the compliant isolator 210 is assembled.

The second ends 242 and 244 of the first and second straps 224 and 226 are secured to the curved end portions 282 of the second and first brackets 270 and 266, respectively. The second ends 242 and 244 of the first and second straps 224 and 226 may be secured to the curved end portions 282 in any suitable manner. For instance, as shown in the depicted embodiment, the second ends 242 and 244 are secured to the curved end portions 282 through fasteners 286, with a washer or plate 288 being disposed between the fasteners 286 and the curved end portion 282.

Figure 6A:
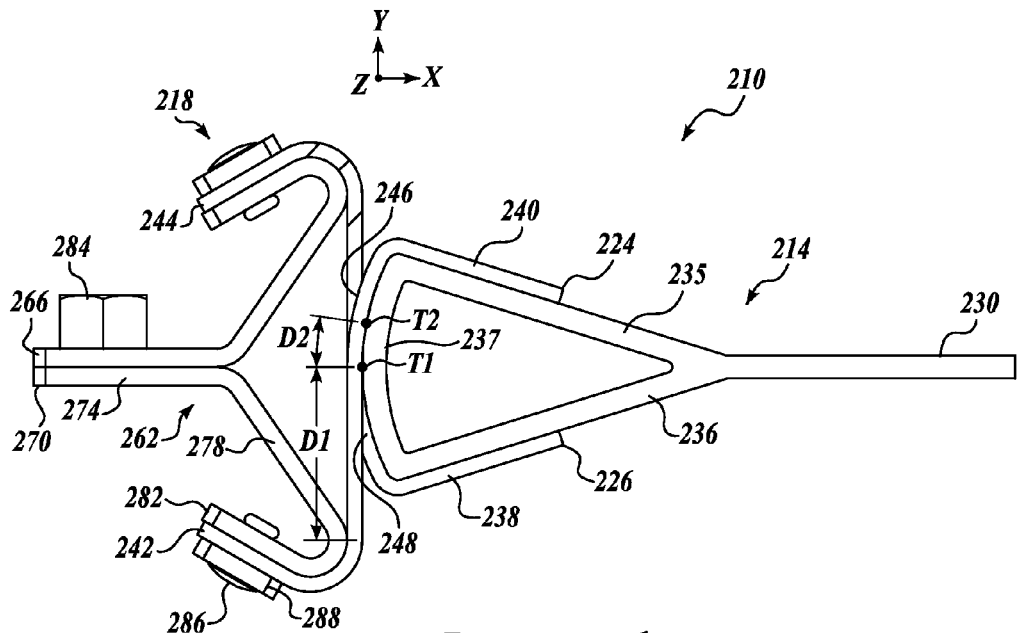
FIG. 6A is a top plan view of the compliant isolator of FIG. 5A, wherein the compliant isolator is shown in a first position.

When assembled, the first and second straps 224 and 226 extend taught between the first and second branch portions 235 and 236 of the strap mounting member 234 and the first and second brackets 266 and 270 of the Y-shaped bracket assembly 262 to define the first and second tangent portions 246 and 248. Moreover, when the compliant isolator 210 is in a first, non-displaced position, as shown in FIG. 6A, a longitudinal axis of each of the first and second tangent portions 246 and 248 (defined along the lengths of the first and second straps 224 and 226) is substantially perpendicular to the X axis. Stated another way, in the first, non-displaced position, the longitudinal axis of each of the first and second tangent portions 246 and 248 extends substantially along the Y axis, and a transverse axis (substantially perpendicular to the longitudinal axis) of each of the first and second tangent portions 246 and 248 extends substantially along the Z axis. It should be appreciated that the strap end mounting assembly 218 may instead include any other bracket assembly configuration suitable for positioning the first and second tangent portions 246 and 250 in this configuration.

Moreover, it should be appreciated that the first and second straps 224 and 226 may have a thickness and width that is substantially uniform along its length, and the first and second straps 224 and 226 may extend along only the cylindrical portion 237, along the first and second branch portions 235 and 236, respectively, and/or along a portion of the vehicle mounting member 230. The thickness and width of the first and second straps 224 and 226 may also be increased or decreased to adjust the resistance of the straps 224 and 226 along the Y axis. Furthermore, although the width of the first and second straps 224 and 226 is substantially uniform along its length, each of the first ends 242 and 244 of the first and second straps 224 and 226 may be enlarged for suitably mounting the first ends 242 and 244 to the curved ends 282 of the first and second brackets 266 and 270.

Figure 6B:
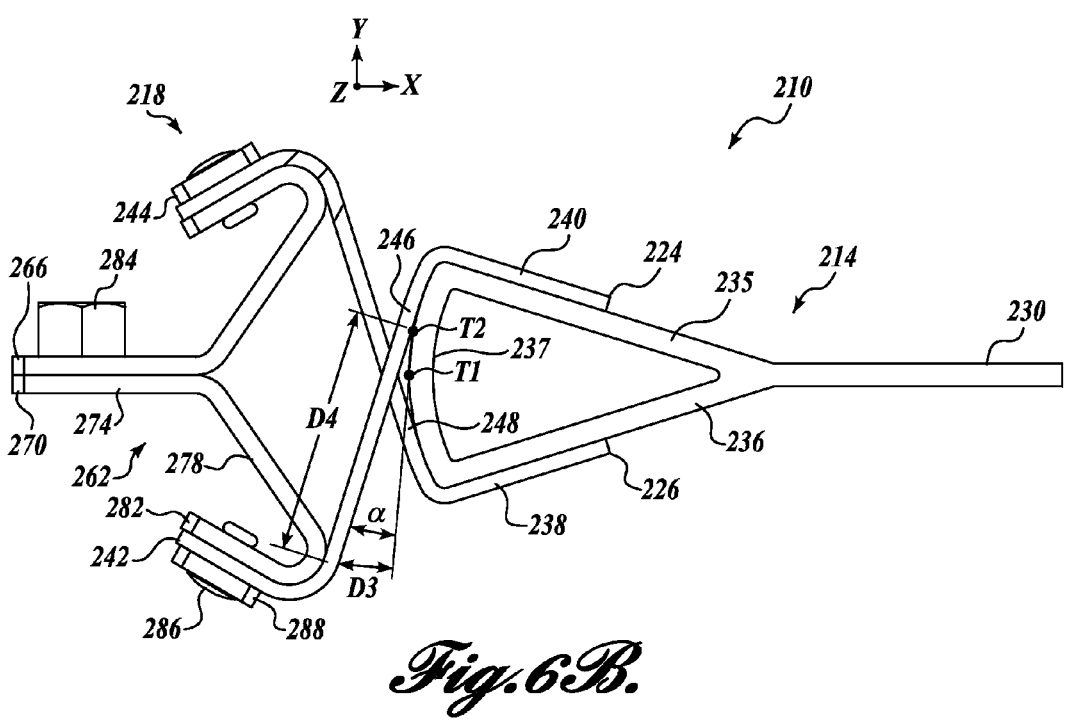
FIG. 6B is a top plan view of the compliant isolator of FIG. 5B, wherein the compliant isolator is shown in a second position.

Referring to FIGS. 6A and 6B, aspects of the compliant isolator 210 for allowing the strap adjustment assembly 214 (and/or the strap end mounting assembly 218) to move along the X axis while substantially preventing movement along the Y axis, will now be described in detail. The strap adjustment assembly 214 is moveable along the X axis between a first non-displaced position, as shown in FIG. 6A, and a second displaced position, as shown in FIG. 6B. It should be appreciated that although functional aspects of the compliant isolator 210 will be described with reference to only the first tangent portion 246 for ease of description, the same is also true for the second tangent portion 248.

Referring specifically to FIG. 6A, in the first non-displaced position, the longitudinal axis of the first tangent portion 246 extends substantially along the Y axis and is substantially transverse to the X axis. As such, the first angle defined between the first tangent portion 246 and the Y axis is substantially equal to zero. With the first tangent portion 246 positioned substantially transfers to the X axis, the first tangent portion 246 must stretch along its length to allow the strap mounting member 234 to move along the Y axis (likewise for the second tangent portion 248). If the first and second straps 224 and 226 are made from a suitably durable material, such as rubber, and the first and second straps 224 and 226 have a sufficient thickness and width, the first and second straps 224 and 226 substantially prevent any movement of the strap mounting member 234 along the Y axis. It should be appreciated that if only one strap 224 or 226 was included in the compliant isolator 210, the single strap would substantially prevent movement along the Y axis in only one direction.

Although the first and second straps 224 and 226 are configured to substantially prevent movement along the Y axis, the first and second straps 224 and 226 may unwind from the cylindrical portion 237 to allow movement along the X axis. In the first non-displaced position, as shown in FIG. 6A, the first and second tangent portions 246 and 248 each have a predetermined initial length. For instance, as shown in FIG. 6A, the initial actual length of the first tangent portion 246 is D1, which is the distance from a first tangency point T1 to the curved end 282 of the first bracket 266. The first tangent portion 246 also includes an unwindable length D2 defined along an arced portion of the cylindrical portion 237. In other words, D2 is the distance the first strap 224 may unwind from the cylindrical portion 237 to allow the strap mounting member 234 to move along the X axis.

Referring to FIG. 6B, the compliant isolator 210 is moved into a second displaced position by moving the strap adjustment assembly 214 along the X axis away from the strap end mounting assembly 218 a predetermined distance D3. To facilitate the movement of the strap adjustment assembly 214 without substantially increasing the strain in the first and second straps 224 and 226, the first and second straps 224 and 226 partially unwind from the cylindrical portion 237 as the strap adjustment assembly 214 is moved along the X axis to increase the length of the first and second tangent portions 246 and 248.

The first and second straps 224 and 226 partially unwind from the cylindrical portion 237 the predetermined amount D2 as the strap adjustment assembly 214 is moved along the X axis. When the first tangent portion 246 unwinds from the cylindrical portion 237 the predetermined amount D2, the tangency point moves from T1 to T2. As a result, the first tangent portion 246 now has a longer length D4 defined between the second tangency point T2 and the curved end 282 of the second bracket 270. Thus, the length of the first tangent portion 246 increases to accommodate the movement of the strap adjustment assembly 214 without substantially increasing the strain therein (wherein the same is true for the second tangent portion 248).

The second length D4 of the first tangent portion 246 is equal to at least the sum of the first length D1 plus the unwound length D2. In prior art rubber isolators, the length of the rubber must stretch to increase in length and accommodate movement. Thus, the strain in the first and second straps 224 and 226 of the compliant isolator 210 is significantly less than the strain in a prior art rubber isolator.

When the straps 224 and 226 unwind from the cylindrical portion 237 to lengthen the first tangent portion 246, the first tangent portion 246 defines a second angle between the first tangent portion 246 and the Y axis (wherein the same is true for the second tangent portion 248). As shown in FIG. 6B, the first tangent portion 246 defines an angle $\alpha$ between the first tangent portion 246 and the Y axis, wherein the angle $\alpha$ is greater than zero.

As can be appreciated from the foregoing, the compliant isolator 210 allows for movement of the strap adjustment assembly 214, and therefore any vehicle component attached thereto, along the X axis without requiring a significant strain in the first and second straps 224 and 226. More specifically, rather than requiring the first and second straps 224 and 226 to significantly stretch in order to accommodate movement of the strap mounting member 234 along the X axis, the first and second tangent portions 246 and 248 of straps 224 and 226 unwind from the cylindrical portion 237 to increase in length.

With portions of the first and second straps 224 and 226 being wound around the cylindrical portion 237, the cylindrical portion 237 converts the arced body portion D2 of the first strap 224 into a straight line by repositioning the tangency point from T1 to T2. The change in tangency point effectively gives the first and second tangent portions 246 and 248 extra length, thereby reducing the strain in the first and second straps 224 and 226. Thus, displacement of the strap mounting member 234 along the X axis requires a very small amount of strain relative to the displaced distance D3. The reduction in strain results in decreased resistance to motion of the strap adjustment assembly 214 along the X axis.

Like the compliant isolator 10, the movement capability and restriction of the compliant isolator 210 is similar to a linear bearing or bushing that allows a component to move along a first axis but substantially prevents movement along a second perpendicular axis. However, the compliant isolator 210 is not susceptible to wear like linear bearings and bushings because it does not include any sliding, hinging, or rolling parts. Moreover, the compliant isolator is more economical to produce as precision parts are not needed. Furthermore, environmental contamination, such as debris, water, and ice, does not substantially affect the function of the compliant isolator 210 as it would with a linear bearing or bushing.

The compliant isolator 210 also provides advantages over a prior art compliant isolator in that a very small amount of strain in the straps 224 and 226 is necessary to move the component along a desired axis. The compliant isolator 210 functions substantially similarly to the compliant isolator 10. Therefore, a comparison of the compliant isolator 210 to a prior art compliant isolator is substantially illustrated in the example provided above with regard to the compliant isolator 10.

While illustrative embodiments have been illustrated and described, it will be appreciated that various changes can be made therein without departing from the spirit and scope of the invention.

The embodiments of the present disclosure in which an exclusive property or privilege is claimed are defined as follows:

1. A mounting assembly, comprising:
   (a) a strap adjustment assembly having a curved cylindrical portion;
   (b) a strap end mounting assembly having a substantially Y-shaped bracket having a stem portion and first and second branch portions extending from the stem portion; and
   (c) a strap assembly having first and second straps, each of the first and second straps having first and second ends, wherein the first ends of the first and second straps are secured to the strap adjustment assembly and wherein the second ends of the first and second straps are secured to the strap end mounting assembly, and wherein each of the first and second straps extends at least partially along the curved cylindrical portion.

2. The mounting assembly of claim 1, wherein a portion of each of the first and second straps unwinds from the curved cylindrical portion to allow movement of at least one of the strap adjustment assembly and the strap end mounting assembly substantially along a first axis.

3. The mounting assembly of Claim 2, wherein the first strap includes a first strap tangent portion extending between a first tangent point of the curved cylindrical portion and the strap end mounting assembly.

4. The mounting assembly of claim 3, wherein a longitudinal axis extending along a length of the first tangent portion is substantially perpendicular to the first axis.

5. The mounting assembly of claim 3, wherein at least one of the strap adjustment assembly and the strap end mounting assembly is moveable substantially along the first axis between a first position, wherein the first tangent portion defines a first angle relative to a second axis substantially perpendicular to the first axis, and a second position, wherein the first tangent portion defines a second angle relative to the second axis, the second angle larger than the first angle.

6. The mounting assembly of claim 5, wherein the first tangent portion has a first length in the first position, and wherein the first tangent portion has a second length longer than the first length in the second position.

7. The mounting assembly of claim 3, wherein at least one of the strap adjustment assembly and the strap end mounting assembly is moveable substantially along the first axis between a first position, wherein the first tangent portion has a first length, and a second position, wherein the first tangent portion has a second length larger than the first length.

8. The mounting assembly of claim 7, wherein the first tangent portion extends between a first tangent point of the curved cylindrical portion and the strap end mounting assembly in the first position, and wherein the first tangent portion extends between a second tangent point of the curved cylindrical portion and the strap end mounting assembly in the second position.

9. The mounting assembly of claim 8, wherein a first strap arc length is defined between the first and second tangent points.

10. The mounting assembly of claim 9, wherein the second length of the first tangent portion is equal to at least the sum of the first strap arc length and the distance between the first tangent point and the first end of the first strap.

11. The mounting assembly of claim 3, wherein the second strap includes a second strap tangent portion extending between a third tangent point of the curved cylindrical portion and the strap end mounting assembly.

12. The mounting assembly of claim 11, wherein the first strap tangent portion crisscrosses the second strap tangent portion.

13. The mounting assembly of claim 11, wherein the first and second tangent portions are secured to first and second distal ends of the first and second branch portions.

14. A mounting assembly, comprising:
(a) a strap adjustment assembly having a curved cylindrical portion;
(b) a strap end mounting assembly having a substantially Y-shaped bracket having a stem portion and first and second branch portions extending from the stem portion; and
(c) a strap assembly having first and second straps, each of the first and second straps having first and second ends, wherein the first ends of the first and second straps are secured to the strap adjustment assembly and wherein the second ends of the first and second straps are secured to the strap end mounting assembly, wherein each of the first and second straps extends at least partially along the curved cylindrical portion, wherein the first strap includes a first strap tangent portion extending between a first tangent point of the curved cylindrical portion and the strap end mounting assembly, and wherein the second strap includes a second strap tangent portion extending between a third tangent point of the curved cylindrical portion and the strap end mounting assembly.

15. The mounting assembly of claim 14, wherein a portion of each of the first and second straps unwinds from the curved cylindrical portion to allow movement of at least one of the strap adjustment assembly and the strap end mounting assembly substantially along a first axis.

16. The mounting assembly of claim 14, wherein a longitudinal axis extending along a length of the first tangent portion is substantially perpendicular to the first axis.

17. The mounting assembly of claim 14, wherein at least one of the strap adjustment assembly and the strap end mounting assembly is moveable substantially along the first axis between a first position, wherein the first tangent portion defines a first angle relative to a second axis substantially perpendicular to the first axis, and a second position, wherein the first tangent portion defines a second angle relative to the second axis, the second angle larger than the first angle.

18. The mounting assembly of claim 17, wherein the first tangent portion has a first length in the first position, and wherein the first tangent portion has a second length longer than the first length in the second position.

19. The mounting assembly of claim 14, wherein at least one of the strap adjustment assembly and the strap end mounting assembly is moveable substantially along the first axis between a first position, wherein the first tangent portion has a first length, and a second position, wherein the first tangent portion has a second length larger than the first length.

20. The mounting assembly of claim 14, wherein the first and second tangent portions are secured to first and second distal ends of the first and second branch portions.

* * * * *